US012122208B2

United States Patent
Heon et al.

(10) Patent No.: US 12,122,208 B2
(45) Date of Patent: Oct. 22, 2024

(54) MODULAR AND EXPANDABLE AIR MANAGEMENT SYSTEM

(71) Applicant: Wheel Pros, LLC, Greenwood Village, CO (US)

(72) Inventors: Reno Heon, San Luis Obispo, CA (US); Dustin Heon, Arroyo Grande, CA (US)

(73) Assignee: Wheel Pros LLC, Greenwood Village, CO (US)

( * ) Notice: Subject to any disclaimer, the term of this patent is extended or adjusted under 35 U.S.C. 154(b) by 0 days.

(21) Appl. No.: 17/983,984

(22) Filed: Nov. 9, 2022

(65) Prior Publication Data

US 2023/0147844 A1 May 11, 2023

Related U.S. Application Data

(60) Provisional application No. 63/277,526, filed on Nov. 9, 2021.

(51) Int. Cl.
   *B60G 17/052* (2006.01)
   *B60G 17/015* (2006.01)

(52) U.S. Cl.
   CPC ..... *B60G 17/0523* (2013.01); *B60G 17/0155* (2013.01); *B60G 2202/152* (2013.01); *B60G 2400/252* (2013.01); *B60G 2400/51* (2013.01)

(58) Field of Classification Search
   CPC ............ B60G 17/0523; B60G 17/0155; B60G 2202/152; B60G 2400/51; B60G 2400/252
   See application file for complete search history.

(56) References Cited

U.S. PATENT DOCUMENTS

| 8,905,071 | B2 * | 12/2014 | Coombs | F15B 13/0853 137/884 |
| 2003/0226606 | A1 * | 12/2003 | Hayashi | F15B 13/0857 137/884 |
| 2006/0032541 | A1 * | 2/2006 | Ford | F16H 61/0009 137/884 |
| 2010/0138116 | A1 * | 6/2010 | Coombs | B60G 17/0523 280/5.514 |

FOREIGN PATENT DOCUMENTS

| EP | 1321320 A2 * | 6/2003 | ............ B60G 11/27 |
| GB | 2392421 A * | 3/2004 | ........... B60G 17/015 |

* cited by examiner

*Primary Examiner* — Faye M Fleming
(74) *Attorney, Agent, or Firm* — Eric Hanscom

(57) ABSTRACT

A Modular and Expandable Air Suspension Control System utilizes three basic units, a suspension control module, one or more pneumatic control modules, and an end cap usable across a variety of applications with different quantities of air springs, including 1-Corner, 2-Corner, 3-Corner, 4-Corner and more than 4-Corner systems. The invention is field expandable, with multiple sensing options as each pneumatic control module has an integrated air spring pressure sensor plus an electrical plug to connect with an electronic height sensor. This capability allows the system to level based on air spring pressure or air spring height depending on the customer use case. The sleek and compact design is piconet-enabled which gives the system connectivity to smartphone apps and dedicated piconet devices for user interface, and allows for over-the-air updating of the firmware inside of the suspension control module and pneumatic control modules to enhance functionality.

12 Claims, 7 Drawing Sheets

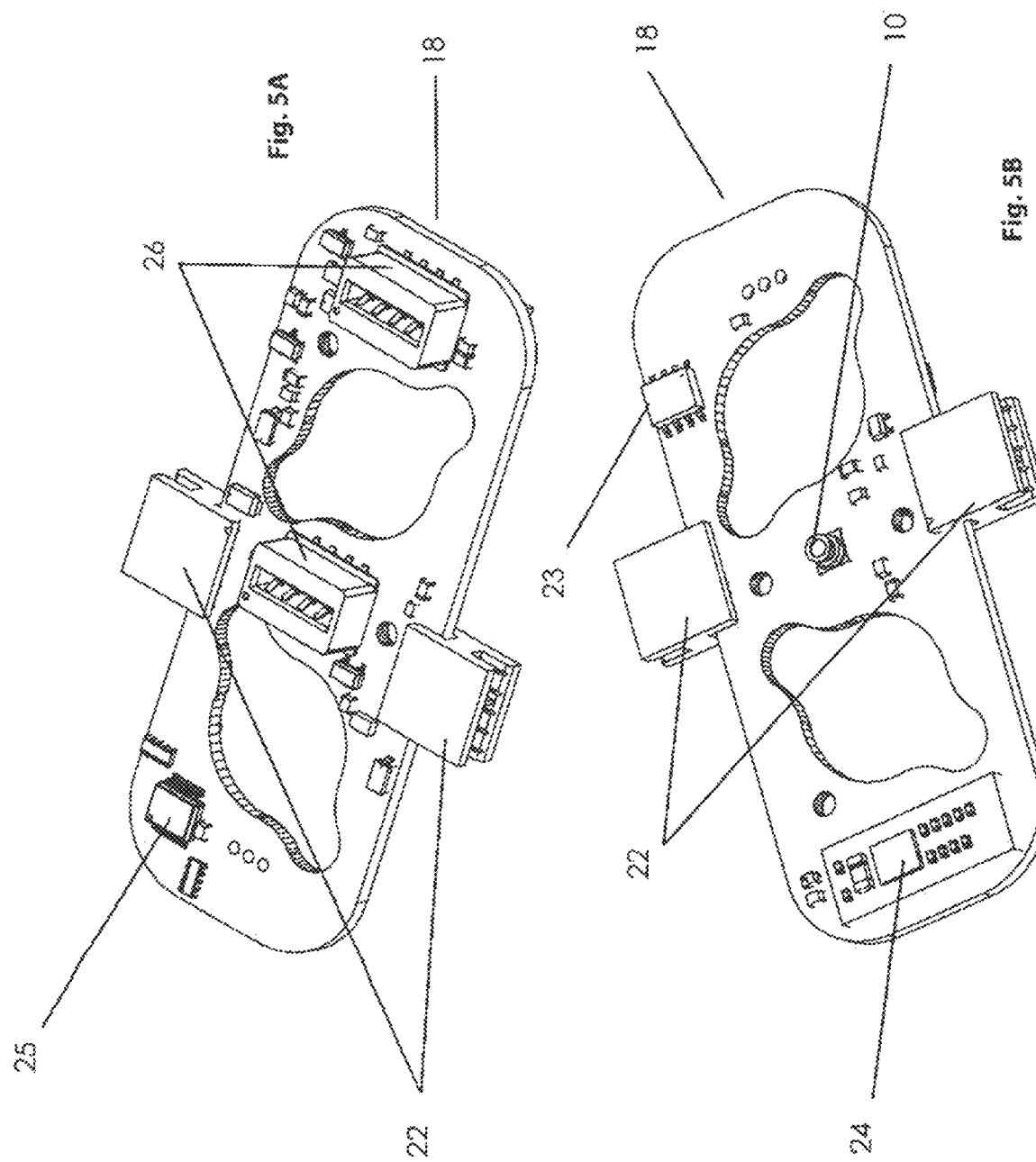

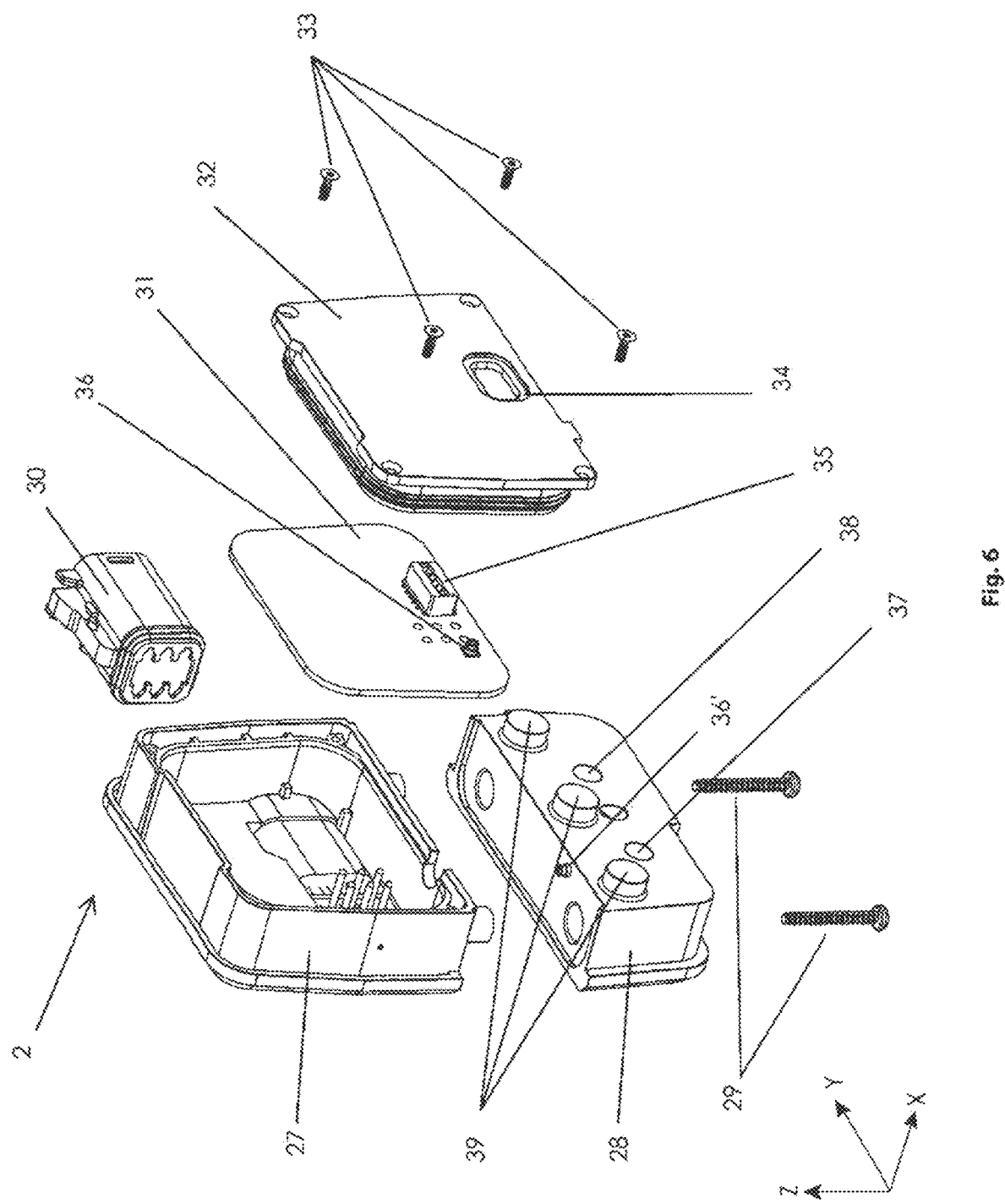

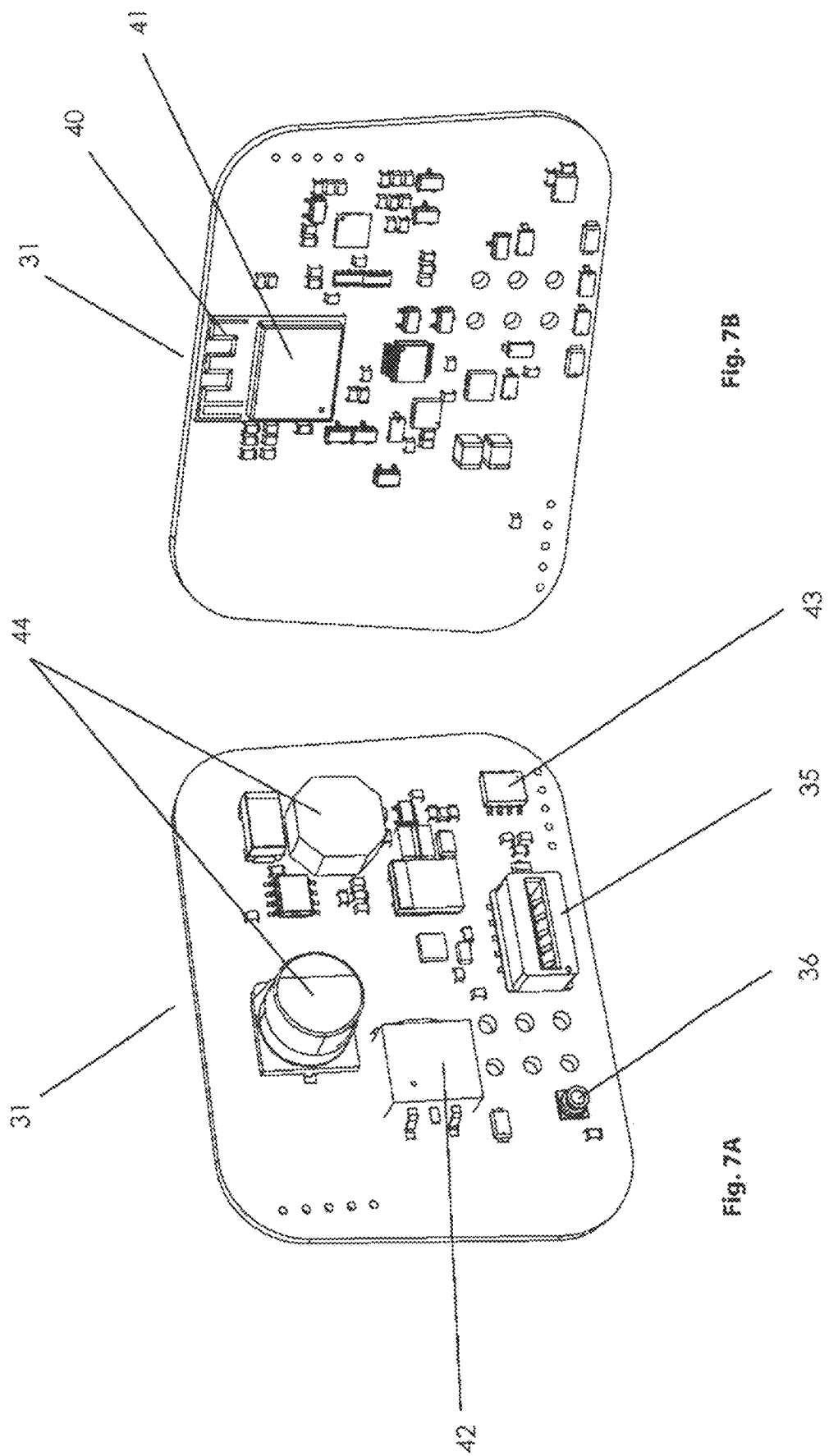

MODULAR AND EXPANDABLE AIR MANAGEMENT SYSTEM

CROSS REFERENCE TO RELATED APPLICATION

This application claims priority to US Provisional No. 63/277,526, filed Nov. 9, 2021, the contents of which are incorporated by reference into this utility patent application.

FIELD OF THE INVENTION

The invention relates to automotive products, and more specifically to air suspension control systems.

BACKGROUND OF THE INVENTION

Air suspension systems for vehicles such as cars and trucks are known. Such systems utilize pressurized suspension units to provide suspension forces and often provide for increases or decreases in the air pressure ("air" as used herein includes other compressible gasses) to adjust the height, load capacity or other characteristic of the suspension. Problems arise in known systems when a user wishes to adjust the suspension characteristics of a vehicle, as when a vehicle's weight or distribution of weight changes, given that adjustment of one suspension unit may affect all other suspension units. Further, installation of additional suspension systems requires coordination with existing units, which is complicated or even not possible with existing systems.

Thus, there is a need for an air suspension system that is easily adapted to changes in system configuration and provides distributed data processing from all individual suspension units for system-wide input to electronic control of all suspension units.

SUMMARY OF THE INVENTION

In accordance with the invention a pneumatic control system uses one or more individual pneumatic control units to control one or more selected characteristics of the suspension units of a vehicle. Each individual pneumatic control unit has a first valve and a second valve, which are preferably electronically controllable, to increase or decrease the pressure in a suspension unit. An increase or decrease in the pressure of a suspension unit may, for example, change the load characteristic of the unit or the height of the unit.

The pneumatic control system of the invention has a master control unit that supports a programmable electronic circuit, which can be on a printed circuit board, and electrical connectors for connecting to a harness or other conductor carrying input information regarding selected characteristics of a suspension unit and generating output information to one or more pneumatic control units to adjust one or more characteristics of a suspension unit to balance all of the suspension units in accordance with a set of algorithms.

A pneumatic control system of the invention may have an end cap that engages and secures one end of a protective cover of the pneumatic control system, provides a hand grip for manipulating the system, or mounting features for use in securing the system to a vehicle.

In the preferred embodiment, a pneumatic control system requires a single master control unit, a single end cap, and one or more pneumatic control units. The number of pneumatic control units depends on the number of suspension units in the particular vehicle. In some cases, one pneumatic control unit may control multiple suspension units.

The design of the invention allows for essentially any number of pneumatic control units to be mounted in serial fashion between a master control unit at one end and an end cap at the opposite end. The system is, thus, field expandable to accommodate different air suspension configurations. Each pneumatic control unit has a device pressure sensor, an electrical input for an external suspension unit height sensor, electronically controlled input and exhaust valves, and an electrical connector to communicate with the master control unit. This allows the pneumatic control system to adjust the suspension units based on selected characteristics such as suspension unit (or "air spring") pressure or height depending on user preferred configurations.

The pneumatic control system of the invention is also wireless enabled to provide the pneumatic control system wireless connectivity to smartphone apps and other wireless devices for user interface during operation or adjustment of the system or firmware updating, and the like.

A preferred embodiment of the invention is a wireless-enabled, air suspension control system comprising a master control unit, one or more pneumatic control units, and an end cap, which can be used in a variety of applications with different arrangements of air springs, such as 1-corner, 2-corner, 3-corner, or 4-corner suspension systems. The invention is modular and expandable, such that it can accommodate different air-suspension configurations and different data sensing options. Providing each pneumatic control unit with integrated, electronic air-spring pressure and height sensors enables the system to be programmed to adjust the vehicle based on air-spring pressure or on air-spring height, depending on the customer's choice. The control system may use smartphone applications or dedicated wireless devices for user interface and updating of system firmware.

BRIEF DESCRIPTION OF THE SEVERAL VIEWS OF THE DRAWINGS

FIG. 1a is perspective view of an assembled pneumatic control system according to the invention.

FIG. 1b is an exploded view of the pneumatic control system of FIG. 1a.

FIG. 2 is a longitudinal cross section of the pneumatic control system shown in FIG. 1a.

FIG. 5a is a perspective of top of a pneumatic control unit electronic control board shown in FIG. 3.

FIG. 5b is a perspective of the bottom of the pneumatic control unit electronic control board shown in FIG. 5a.

FIG. 6 is an exploded perspective of a master control unit of the pneumatic control system shown in FIG. 1.

FIG. 7a is a perspective of a front side of a master control unit electronic control board shown in FIG. 6.

FIG. 7b is a perspective of a rear side of the master control unit electronic control board shown in FIG. 7a.

DETAILED DESCRIPTION OF THE FIGURES

Figure 1:
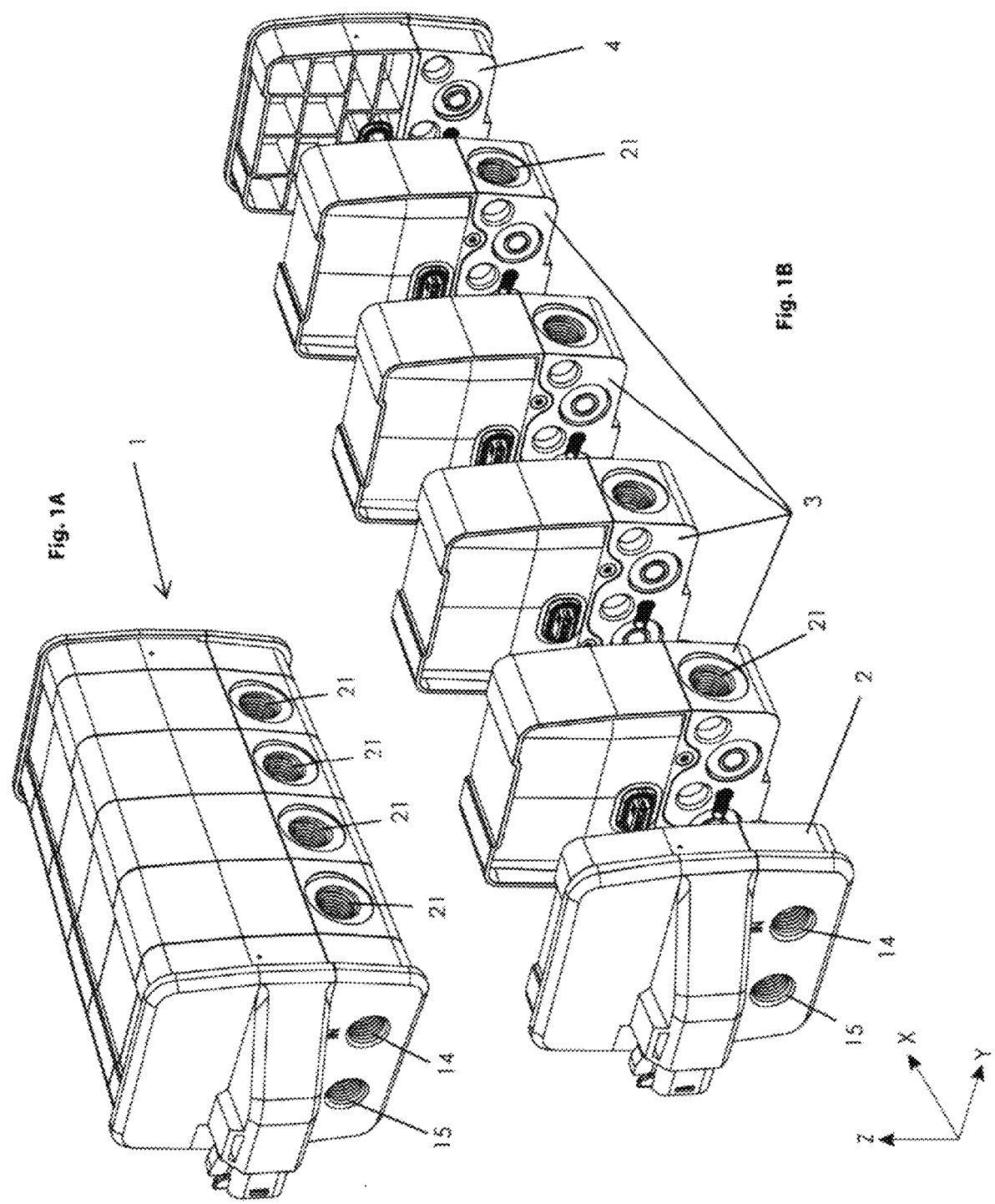

FIG. 1a shows a pneumatic control system 1 according to the invention completely assembled. Pneumatic control system 1 is designed to be connected to and control four known air-suspension units that are mounted to a vehicle in a known manner at pneumatic device fittings 21; neither the vehicle nor an air-suspension unit is illustrated in these drawings. Pneumatic control system 1 as shown in FIGS. 1*a* and 1*b* is shown with four pneumatic control units 3 connected to a master control unit 2 and an end cap 4. As will be explained in more detail below, air under pressure is introduced to the pneumatic control system 1 from a pump (not shown) at pneumatic inlet fitting 14, and excess air is discharged at pneumatic exhaust fitting 15.

Figure 2:
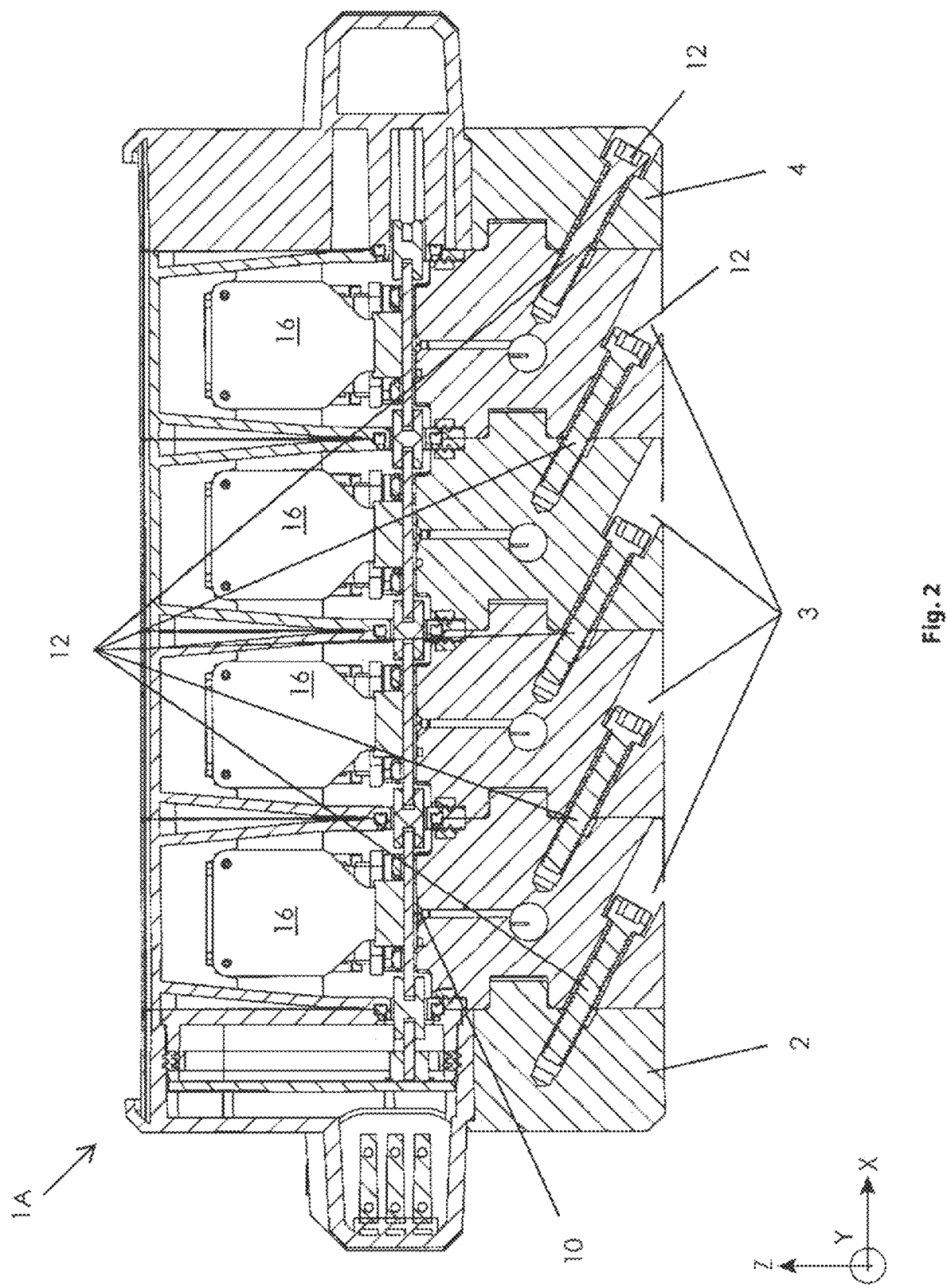

FIG. 2 illustrates the serial connection of four pneumatic control units 3, as illustrated in FIG. 1*a*. Angled fasteners 12 are shown holding each pair of modules 3 to each other and to the master control unit 2 and end cap 4, but other means, such as clamps or adhesives may be employed. Device pressure sensors 10 and their associated device air pressure channels 10' are also seen in this figure.

Figure 3:
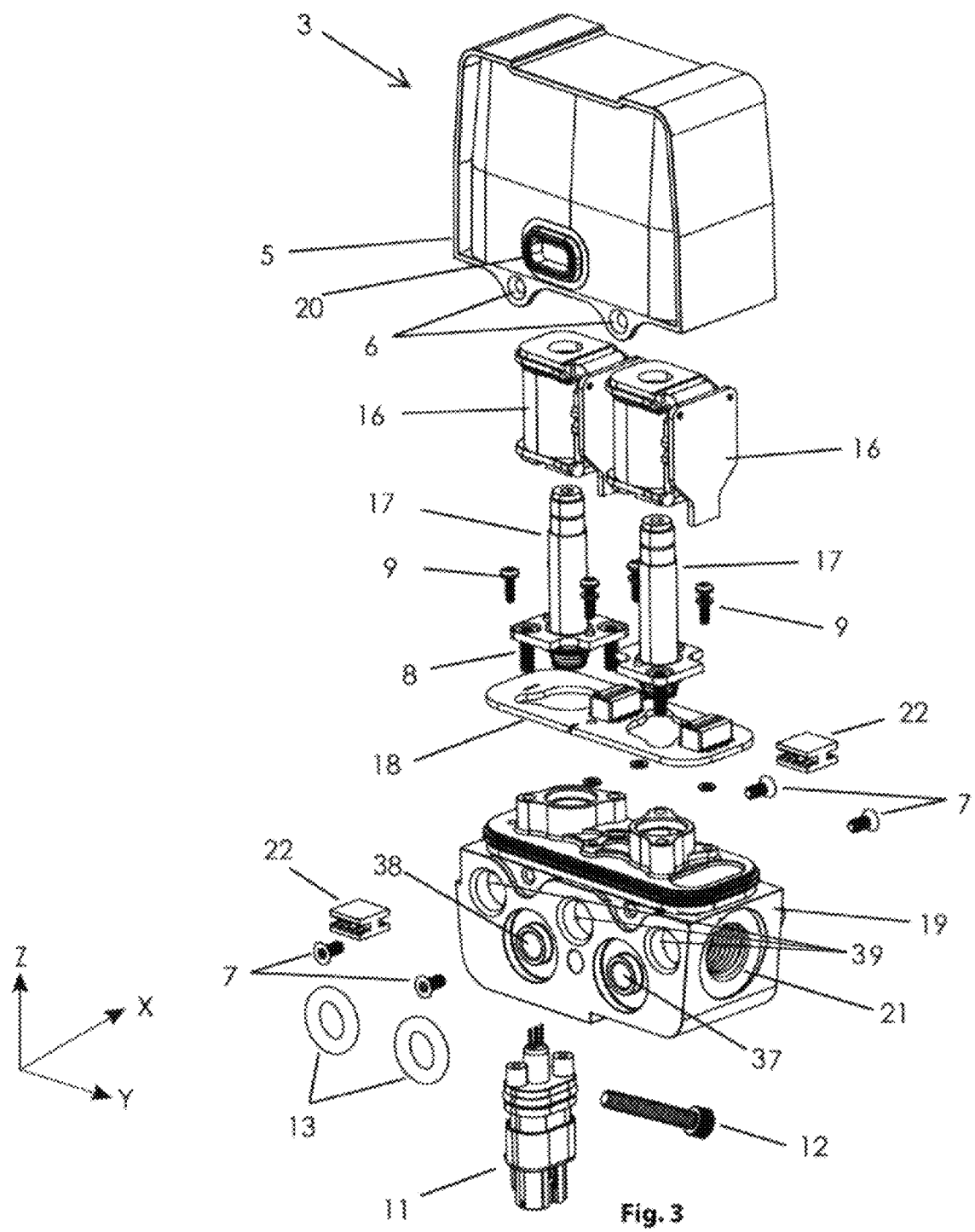
FIG. 3 is an exploded view of the components of one pneumatic control unit shown in FIG. 1b.

FIG. 3 is an exploded perspective of a single pneumatic control unit 3. Pneumatic control unit 3 includes a first valve 46 and a second valve 47 comprised of two pneumatic solenoid valve armatures 17, each of which is electrically controlled by a respective solenoid coil and yoke assembly 16. The pneumatic solenoid valve armatures 17 are mounted on a pneumatic control manifold 19 by solenoid screws 8. Pneumatic control manifold 19 includes an internal device channel 45 connected to pneumatic device fitting 21, which is selectively connected, to input channel 37 and output channel 38 by the pneumatic solenoid valve armatures 17. Pneumatic device fitting 21 is in turn connected to an air-spring suspension unit on a vehicle. A pneumatic control unit electronic control board 18 is mounted to the manifold 19 with circuit board screws 9.

Figure 4:
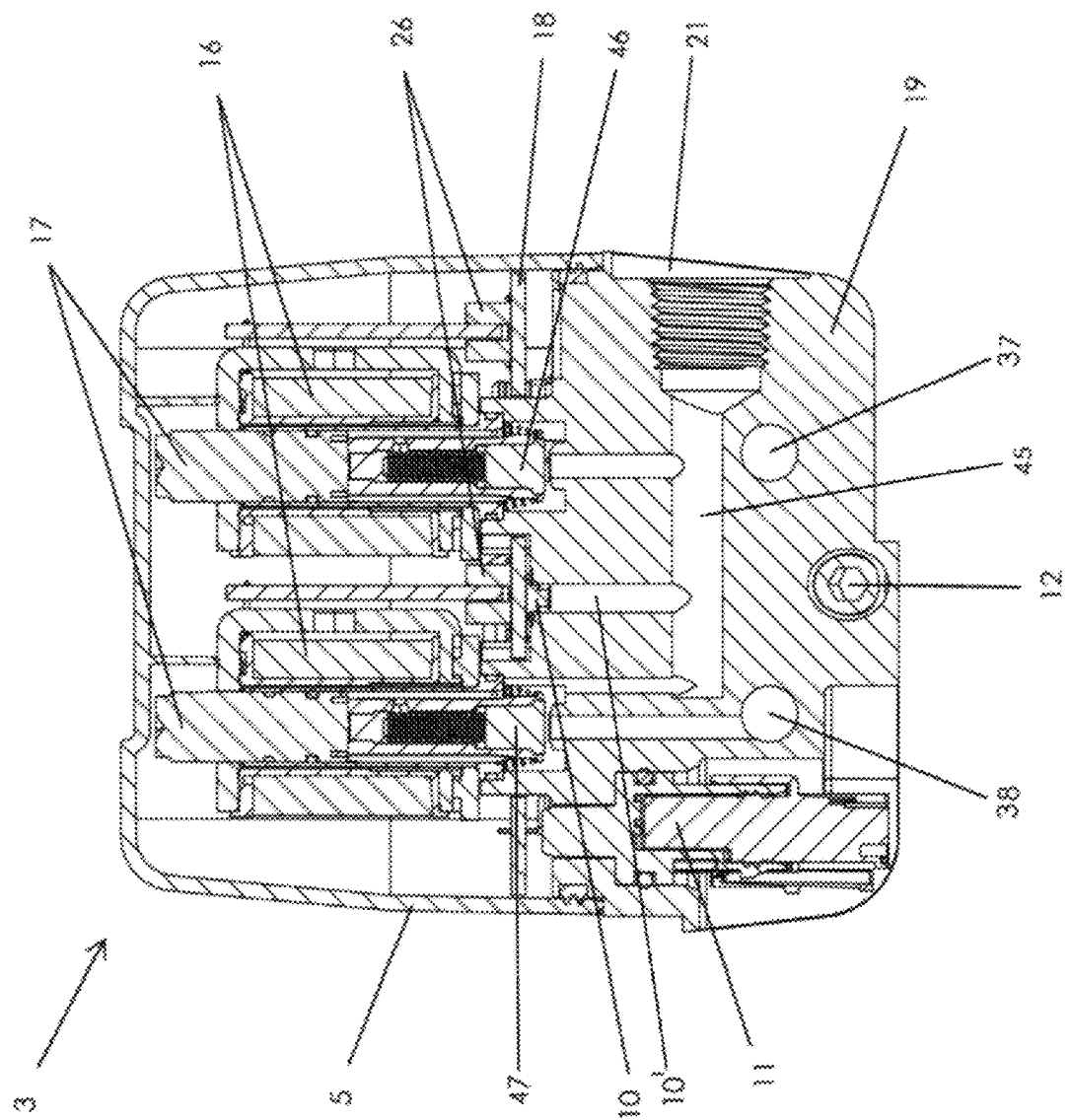
FIG. 4 is a transverse cross section of a pneumatic control unit shown in FIG. 1b.

FIG. 4 is a transverse cross section of single pneumatic control unit 3.

The pneumatic control unit electronic control board 18 is shown in more detail in FIGS. 5*a* and 5*b*. Board 18 gathers data from its pressure and height sensors and communicates these signals to the master control unit. In turn, the master control unit calculates the current versus desired state of the air spring suspension based on conditions and user input and commands board 18 to control the operation of the solenoids 16 resulting in a change in pressure and height of the air spring. Thus, a pneumatic solenoid valve armature 17 that controls air flow between pneumatic inlet fitting 14 and pneumatic device fitting 21 can be opened by activation of the coil and yoke assembly 16 that controls that armature to increase the pressure in an air-spring suspension. Conversely the pneumatic solenoid valve armature 17 controlling air flow between the pneumatic exhaust fitting 15 and pneumatic device fitting 21 can be opened by activation of the other coil and yoke assembly 16 to reduce the pressure in the air-spring suspension.

Board 18 includes device pressure sensor 10 which is connected to the device channel 45 via the device air pressure channel 10' to provide electronic data to microprocessor 24 of the pressure in the air-spring suspension. Electrical interconnectors 22 provide electrical connection between one or more other pneumatic control units 3 and the master control unit 2.

Referring to FIG. 3, a pneumatic control unit 3 further includes a weather-sealed cover 5, which includes electrical interconnect seals 20 is attached to the manifold by cover screws 7 at cover holes 6 to render the module weatherproof. Also, as shown in FIG. 3, the input channel 37 and output channel 38 have pneumatic interconnect seals 13 and male and female projections 39 that allow these ports to connect and seal with an adjacent pneumatic control units 3, master control unit 2, or end cap 4. A height sensor, not shown, is provided to sense the height of the air-spring suspension and can be physical or otherwise. The height sensor provides electronic data regarding height, the data being supplied to board 18 by a height sensor connector 11.

FIGS. 5*a* and 5*b* show the front and back of the pneumatic control unit electronic control board 18. In addition to the aforementioned device pressure sensor 10, the board also includes electrical inter connectors 22, a CANbus driver 23, a microprocessor 24, a solenoid driver 25, and coil connectors 26.

FIG. 6 is an exploded view of a master control unit 2. This unit includes a master control manifold 28 with input channel 37 and output channel 38, which connect with pneumatic inlet fitting 14 and pneumatic exhaust fitting 15, respectively, of an adjacent pneumatic control unit 3. Male and female projections 39 ensure alignment with an adjacent module 3. A master control housing 27 is secured to the master control manifold 28 by screws 29. The master control housing 27 includes a sealed electrical connector 30 to carry power and ground to the system. A master control unit electronic control board 31 is carried in the housing 27, the board 31 having an input channel pressure sensor 36, which communicates with input channel 36', and an electrical connector 35 to receive electronic data from the pneumatic control units and send commands to the pneumatic control units in order to cause increased or decreased pressure in the air-spring suspension units. A cover 32 encloses the housing by screws 33 and provides electrical interconnect seals 34 for the electrical connector 35.

FIGS. 7*a* and 7*b* show the front and back of the master control unit electronic control board 31. The board 31 also includes wireless module 40, microprocessor 41, voltage regulator 42, CANbus driver 43, and electronic filtration components 44.

It will be appreciated that a system as described above provides one or more of the following advantages:

The modularity and expansion capability of the invention allows the master control unit, any number of pneumatic control units, and an end cap to be used in a variety of applications having different numbers of air-spring suspension units. For example, several common uses are:

Two rear air-spring suspension units can be operated in unison by using a tee to divide a single pressure supply between left and right air-spring units. This arrangement works well if there is no offset load or tall center of mass that will allow too much sway around corners. Such a use would require only a single pneumatic control unit along with a master control unit and an end cap and is often termed a "1-corner system".

Two rear air-spring suspension units can be operated independently in order to balance an offset load or prevent sway around corners. This use would require two pneumatic control units, in addition to a master control unit and an end cap. This arrangement is often termed a "2-corner system."

A system having four air-spring suspension units can place two units at the left and right sides of the front of a vehicle and two units at the left and right sides of the rear of a vehicle. The two rear air-spring suspension units may be connected by a tee to a common source of air from a single pneumatic control unit, while the front two units are individually controlled, respectively by two pneumatic control units. This arrangement requires three pneumatic control units, as well as a master control unit and an end cap and is often termed a "3-corner system".

A system having four air-spring suspension units as described above may use separate air sources for each of the four air-spring suspension units. This arrangement would require four pneumatic control units, a master control unit, and an end cap. Such a system is often termed a "four-corner system".

Trucks, buses, or military vehicles with air suspension and more than 2-axles, or any towing vehicle with air suspension that pulls a trailer that also has air suspension could utilize more than 4 pneumatic control units, a master control unit, and an end cap.

Field Expandable—The simple mechanical interconnect solutions allow simple field upgradability or service of a single pneumatic control unit in the case of a failure.

Multiple Sensing Options—Each pneumatic control unit has an integrated air-spring pressure sensor and an electrical plug to connect with an electronic height sensor. This capability allows the system to level a vehicle based on air spring pressure or air spring height depending on the customer use case.

Wireless Enabled Master Control Unit—The wireless module located inside of the Master Control Unit gives the system wireless connectivity, for example, to smartphone apps and dedicated wireless devices for user interface. This communication gateway also allows for Over the Air (OTA) updating of the firmware inside of the master control unit and pneumatic control module(s) in order to bring enhanced features and functionality to the system over time.

Sleek and Compact—The industrial design with optional aluminum cover makes for a visually attractive solution for display in visual installations. The compact packaging design allows for minimal space consumption (approximately 3.3"×3.0"×8.0" for the 4-Corner configuration).

The invention claimed is:

1. A pneumatic control unit comprising:
   a pneumatic control manifold having an input channel for receiving pressurized air into said pneumatic control manifold, an output channel for exhausting air from said pneumatic control manifold and a device channel for inflating or deflating a pneumatic device from said pneumatic control manifold, where said device channel is connected to a pneumatic device fitting,
   a first valve for controlling passage of said pressurized air from said input channel to said device channel,
   a second valve for controlling passage of said air from said device channel to said output channel,
   a device pressure sensor for detecting the pressure of said pressurized air and providing a pressure electrical signal representing said pressure of said pressurized air at said device channel, and
   a pneumatic control module electronic control board responsive to said device pressure sensor electrical signal and generating a control signal to operate said first valve and said second valve to adjust said pressure of said device channel.

2. A pneumatic control unit according to claim 1 wherein said pneumatic control unit electronic control board receives device height-sensor data from an external sensor.

3. A pneumatic control unit according to claim 2, wherein the pneumatic control unit electronic control board contains two electrical inter connectors, two coil connectors, a microprocessor, a device air pressure sensor, a height sensor connector, a solenoid driver and a CANbus driver).

4. A pneumatic control unit according to claim 2, wherein a weather-sealed cover attaches to said pneumatic control manifold isolating said pneumatic control unit electronic control board from harsh environments.

5. A pneumatic control system comprising one or more pneumatic control units according to claim 2 connected to a master control unit and end cap such that the said master control unit and said pneumatic control units and said end cap are in pneumatic and electrical communication such that said input channels of said pneumatic control units are in pneumatic communication with the input channel of said master control unit and said output channels of said pneumatic control units are in pneumatic communication with the output channel of said master control unit and wherein said electrical sensor data from said pneumatic control units is aggregated in the master control unit and wherein said electrical control signals are distributed by the master control unit to the pneumatic control units.

6. A pneumatic control system according to claim 5 wherein said master control unit, said pneumatic control units, and said end cap are aligned to one another with male and female projections and sealed to one another with interconnect pneumatic seals and interconnect electrical seals and fixed to one another by angled fasteners.

7. A pneumatic control system according to claim 5 wherein said electrical signals contain pressure data.

8. A pneumatic control system according to claim 7 wherein said electrical signals contain height data.

9. A pneumatic control system according to claim 5 wherein said master control unit includes a master control unit electronic control board.

10. A pneumatic control system according to claim 9 wherein said master control unit electronic control board includes a microprocessor, a wireless module, an input channel pressure sensor, a voltage regulator, a CANbus driver, and electrical filtration components.

11. A method of controlling an air-spring suspension system comprising the steps of: providing a pneumatic control system according to claim 7, and
   connecting a said pneumatic device fitting of each of said pneumatic control units to an air-spring suspension unit.

12. A method of controlling an air-spring suspension system comprising the steps of: providing a pneumatic control system according to claim 8, and
   connecting a said pneumatic device fitting of each of said pneumatic control units to an air-spring suspension unit and connecting a said height sensor from each air spring suspension unit to each of said pneumatic control units.

* * * * *